United States Patent [19]

Araki et al.

[11] 4,149,997

[45] Apr. 17, 1979

[54] METHOD FOR MANUFACTURE OF CATALYST USED FOR REDUCTION OF NITROGEN OXIDES AND THE CATALYST PRODUCED BY THE METHOD

[75] Inventors: Tadashi Araki; Hatsuo Saito; Masayuki Funabashi; Ritaro Saito, all of Iwaki; Koji Seguchi, Hino, all of Japan

[73] Assignee: Kureha Kagaku Kogyo Kabushiki Kaisha, Tokyo, Japan

[21] Appl. No.: 865,190

[22] Filed: Dec. 28, 1977

[30] Foreign Application Priority Data

Jan. 20, 1977 [JP] Japan .................................... 52/5286

[51] Int. Cl.$^2$ ...................... B01J 23/34; B01J 23/26; B01J 23/30; B01J 23/84
[52] U.S. Cl. .................................... 252/471; 252/454; 252/467; 423/213.2; 423/213.5; 423/239
[58] Field of Search ...................... 252/454, 467, 471; 423/213.2, 213.5, 239 A, 592, 599

[56] References Cited

U.S. PATENT DOCUMENTS

| | | | |
|---|---|---|---|
| 1,937,488 | 11/1933 | Jenness | 252/471 X |
| 3,880,982 | 4/1975 | Stenzel | 252/471 X |

*Primary Examiner*—W. J. Shine
*Attorney, Agent, or Firm*—Stevens, Davis, Miller & Mosher

[57] ABSTRACT

A catalyst having high activity at a low temperature is obtained by heating rhodochrosite in air at a temperature of 300°–500° C. A catalyst having still higher activity at a low temperature is obtained by mixing rhodochrosite with a specific amount of a specific metal compound and heating the resultant mixture in air at a temperature of 300°–500° C.

7 Claims, No Drawings

METHOD FOR MANUFACTURE OF CATALYST USED FOR REDUCTION OF NITROGEN OXIDES AND THE CATALYST PRODUCED BY THE METHOD

FIELD OF THE INVENTION

This invention relates to a method for the manufacture of catalysts to be used in the reduction with ammonia of nitrogen oxides (hereinafter referred to as $NO_x$) contained in a gas.

BACKGROUND OF THE INVENTION

Various methods have been heretofore suggested for the removal of $NO_x$ from $NO_x$-containing exhaust gases such as those issuing from combustion sources. Among them, the method which resorts to contact reduction using ammonia ss the reducing agent is considered to be highly promising because it is amply effective even when it is used for the treatment of exhaust gases of the type containing $NO_x$ and oxygen in relatively high concentrations. This method includes contacting a given exhaust gas containing $NO_x$ with ammonia at a temperature in the range of from 200° C. to 400° C. in the presence of a catalyst and permitting the $NO_x$ to react with ammonia thereby effecting conversion of $NO_x$ into $N_2$. The reactions involved in this method are represented by the following formulas:

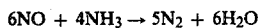

$$6NO + 4NH_3 \rightarrow 5N_2 + 6H_2O$$

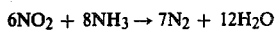

$$6NO_2 + 8NH_3 \rightarrow 7N_2 + 12H_2O$$

For use in the treatments by the contact reduction method, there have been developed and suggested various kinds of synthetic catalysts including platinum-based catalysts, iron-based catalysts and copper-based catalysts. Of these catalysts, those other than platinum-based catalysts are generally deficient in activity at a low temperature below the level of 200° C. Platinum-based catalysts, however, have a disadvantage that, with the progress of the reduction, they have their activity gradually degraded owing to the poisoning caused by sulfur oxides (hereinafter referred to as $SO_x$) present in the exhaust gas under treatment and, moreover, the range of a temperature at which they exhibit high activity is narrow. Worse still, platinum-based catalysts are expensive.

The requirements which, from the industrial point of view, the catalyst being used in the contact reduction of $NO_x$ must fulfil to ensure advantageous performance in the contact reduction method are:

(1) the catalyst should be capable of retaining its high capacity for removing $NO_x$ even at a low temperature, and (2) the catalyst should be produceable at low cost.

Extensive research has been conducted in search of catalysts which satisfy these requirements.

SUMMARY OF THE INVENTION

It is, therefore, an object of the present invention to provide a method for the manufacture of a catalyst for use in the reduction of $NO_x$, which satisfies the aforementioned requirements.

This and the other objects of the present invention will become apparent from the description to follow.

We have now discovered that a catalyst which is obtained by heating rhodochrosite, an inexpensive naturally occurring ore, in air at a temperature in the range of from 300° C. to 500° C., exhibits high activity in the reduction of $NO_x$ even below the level of 200° C. We have further ascertained that a catalyst obtained by heating a mixture of rhodochrosite with a specific amount of a specific metal compound under the conditions mentioned above exhibits still higher activity.

According to the present invention, there is provided a method for the manufacture of a catalyst for use in the reduction of $NO_x$, which method includes heating rhodochrosite in air at a temperature in the range of from 300° C. to 500° C. There is further provided, according to this invention, a method for the manufacture of a catalyst for the reduction of $NO_x$, which method includes (1) mixing with the rhodochrosite 1 to 80% by weight, based on the weight of the rhodochrosite, of a compound selected from the group consisting of the oxides of Fe, Ni, Cr, Co, Cu, Zn, Sn, Ti, V and W or of at least one compound which is converted into oxide or oxy-hydrate when heated in air at a temperature in the range of from 300° C. to 500° C., and (2) heating the resultant mixture in air at a temperature in the range of from 300° C. to 500° C.

DETAILED DESCRIPTION OF THE INVENTION

The rhodochrosite used in the present invention is a mineral carbonate of manganese which occurs widely throughout the world. In veins of metal ores, for example, it occurs in conjunction with zinc blende and galena. In veins of a mixed ore of zinc blende and galena (associated with the designation "green tuff"), it occurs in combination with marcasite and zinc blende. In paleozoic strata, it occurs in veins of the shape of giant lenses or in multistratal veins. The composition of the ore varies with the location of its source. The rhodochrosite produced at Oye Mine in Japan, for example, consists of 3.83% by weight of FeO, 55.74% by weight of MnO, 0.59% by weight of MgO, 1.29% by weight of CaO and 38.4% by weight of $CO_2$. The ore produced in Zaire and in Hokkaido happens to contain from 8 to 10% by weight of $SiO_2$. The rhodochrosite is a cleavable, brittle mineral and is readily reduced into a fine powder.

In the present invention, rhodochrosite (preferably in a powdered form) is heated in air at a temperature in the range of from 300° C. to 500° C. During the heating, the rhodochrosite emits carbon dioxide gas. This heating to the rhodochrosite is preferably continued until the emission of carbon dioxide gas substantially ceases (namely, until not less than 90% of all the components of the mineral which are converted under the prevalent conditions of the heating treatment into carbon dioxide gas have been liberated in the form of carbon dioxide gas from the mass under treatment). To be more specific, the preferred liberation of carbon dioxide gs is advantageously obtained by carrying out the heating at 400°C. for a period of about five to ten hours. It should be noted that the heating, if continued for a longer period, gives a product which exhibits deficient catalytic activity, probably because the excessive heating causes a change in the crystalline condition of rhodochrosite. Like any known catalyst, the product obtained by the heating treatment described above is mixed, as occasion demands, with an inorganic binder such as colloidal alumina and then molded into spheres or cylinders of a suitable size. In connection with the heating treatment described above, the rhodochrosite may preferably be blended with an added inorganic binder and then molded to a desired shape and size so that the material in the form of a molded mixture will be subjected to the heating treatment. The procedure in which the rhodochrosite to be used is molded prior to the heating treatment is preferably to a procedure in which it is molded subsequent to the heating treatment because the molded catalyst obtained by the former procedure enjoys higher physical stability than that obtained by the latter procedure.

The present invention in another embodiment mixes the rhodochrosite (preferably in finely powdered form) with 1 to 80% by weight, based on the weight of the rhodochrosite, of a substance selected from the group consisting of the oxides of specific metals or of at least one compound which is converted into oxide or oxyhydrate when heated in air at a temperature in the range of from 300° C. to 500° C. and similarly subjects the resultant mixture to heating in air at a temperature in the range of from 300° C. to 500° C. Consequently, there is obtained a product which posseses still higher catalytic activity and offers a wider range of effective working temperatures. The "oxides of specific metals" mentioned above are the oxides of Fe, Ni, Cr, Co, Cu, Zn, Sn, Ti, V and W. The "compounds which are converted into oxides or oxy-hydrates when heated in air at temperatures in the range of from 300° C. to 500° " mentioned above embrace nitrates, carbonates, hydroxides, ammonium salts, chlorides, etc. of the aforementioned metals. Also, in the case of a molded catalyst, the aforementioned procedure of molding prior to heating is preferred.

The product obtained by subjecting the rhodochrosite or the mixture of rhodochrosite to the heating treatment is exceptionally amorphous and highly porous and, unlike all known $NO_x$-removing catalysts containing manganese compounds, exhibits notably high activity at a temperature in the range of from 100° C. to 200° C., particularly from 120° C to 200° C. and effects the required $NO_x$-removal with high efficiency in actual use. The outstanding properties of the catalyst of this invention are clear from the comparison of this catalyst with a manganese dioxide ore to be described below.

Preferably, the rhodochrosite or the mixture of rhodochrosite may be mixed in advance with a suitable inorganic binder such as, for example, colloidal alumina and, in the resultant mixed form, molded to a desired shape and size. In this case, the amount of the inorganic binder to be added is preferred to be below the level of 5% by weight, preferably in the range of from 1 to 3% by weight, based on the weight of the rhodochrosite or the mixture of rhodochrosite. The inorganic binder so added advantageously serves to impart a suitable amount of strength to the molded catalyst finally obtained.

With a view to maximizing the duration of the catalytic activity of the catalyst obtained as described above, the exhaust gas to which the catalyst is applied is preferred to have undergone a pretreatment whereby its $SO_x$ content is lowered to below 1 ppm, preferably below 0.1 ppm. The amount of ammonia to be used in the reaction with $NO_x$ contained in the exhaust gas is preferred to be such that the molar ratio of $NH_3/NO_x$ will fall in the range of from 0.7 to 2.0, preferably in the neighborhood of 1.0. The feed rate of ammonia is preferably fixed in the range of from 500 to 100,000 $hr^{-1}$ in terms of space velocity.

The present invention will be further described herein below with reference to working examples. It should be noted that the present invention is not limited in any way to the examples.

EXAMPLE 1

Rhodochrosite (composed predominantly of 29.4% by weight of Mn and 10.6% by weight of $SiO_2$) produced in Hokkaido of Japan was pulverized, kneaded in water with 2% by weight of colloidal alumina, extrusion molded, dried at 120° C., cut into small cylinders 3 mm in diameter and about 10 mm in length and heated at 400° C. in a sufficient draft for 5 hours.

When a $N_2$ gas containing 500 ppm of NO, 500 ppm of $NH_3$, 3% by volume of $O_2$, and 10% by volume of $H_2O$ was passed at 160° C. through a bed of the catalyst obtained as described above at a space velocity of 5000 $hr^{-1}$, the ratio of $NO_x$-removal was 97%. Likewise, the ratio of $NO_x$-removal was 91% a 140° C. and 98% at 200° C.

COMPARISON EXAMPLE 1:

The same $N_2$ gas, containing 500 ppm of NO, etc., was passed through a catalyst bed following the procedure of Example 1, except that a manganese dioxide ore produced in Gold Coast was used as the catalyst (having, as its principal component, 42% by weight of Mn). The ratio of $NO_x$-removal obtained was 80% at 160°C., 65% at 140° C. and 85% at 200° C. Thus, the catalyst was found to be inferior in performance, particularly at a low temperature.

EXAMPLE 2

Rhodochrosite (having, as its principal components, 33% by weight of Mn and 7% by weight of $SiO_2$) produced in Zaire was molded and dried under the same conditions as in Example 1, and subsequently heated at 450° C. in a current of air for five hours. When a $N_2$ gas containing 200 ppm of NO, 200 ppm of $NH_3$, 5% by volume of $O_2$ and 12% by volume of $H_2O$ was passed through a bed of the catalyst at 160° C. at a flow rate of 5000 $hr^{-1}$ in terms of space velocity, the ratio of $NO_x$-removal was 94%.

EXAMPLE 3

The same rhodochrosite as used in Example 2 was mixed with the various additives indicated in Table 1, molded and heated under the same conditions as those of Example 1. The products consequently obtained were similarly tested for ratio of $NO_x$-removal. The results are also shown in Table 1. The composition of the gas used for the test and the feed rate of the gas were the same as those of Example 2.

Table 1

| Composition | | Ratio of $NO_x$- removal | Temperature of $NO_x$- removal |
|---|---|---|---|
| 90% by weight of rhodochrosite | 10% by weight of ferrous nitrate | 92% | 180° C. |
| 80% by weight of rhodochrosite | 20% of cuprous oxide | 98% | 150° C. |
| 80% by weight of rhodochrosite | 20% by weight of cupric oxide | 98% | 150° C. |
| 80% by weight of rhodochrosite | 20% by weight of titanium tetrachloride | 94% | 150° C. |
| 90% by weight of rhodochrosite | 10% by weight of nickel nitrate | 91% | 180° C. |
| 90% by weight of rhodochrosite | 10% by weight of chromium sesquioxide | 98% | 200° C. |

Table 1-continued

| Composition | | Ratio of NO$_x$- removal | Temperature of NO$_x$- removal |
|---|---|---|---|
| 80% by weight of rhodochrosite | 20% by weight of cobalt acetate | 92% | 160° C. |
| 90% by weight of rhodochrosite | 10% by weight of ammonium vanadate | 99% | 200° C. |
| 90% by weight of rhodochrosite | 10% by weight of tungsten trioxide | 96% | 150° C. |

EXAMPLE 4

Catalysts having the compositions indicated in Table 2 were prepared from the same rhodochrosite of Hokkaido origin (as used in Example 1) as the basic component by following the procedure of Example 1 and they were evaluated in terms of performance. The results are also shown in Table 2. The composition of the gas used in the test and the space velocity of the gas were the same as those in Example 1.

Table 2

| Composition | | | Ratio of NO$_x$-removal | |
|---|---|---|---|---|
| | | | 150° C. | 200° C. |
| 90% by weight of rhodochrosite | 10% by weight of cuprous oxide | Immersed in aqueous 10% by weight ammonium metavanadate solution | 97.3% | 99.2% |
| 70% by weight of rhodochrosite | 30% by weight of cuprous oxide | Immersed in aqueous 10% by weight ammonium metavanadate solution | 97.4% | 98.2% |
| 20% by weight of rhodochrosite | 80% by weight of zinc oxide | No immersion | 92.1% | 96.3% |

EXAMPLE 5

By sifting the same rhodochrosite of Hokkaido origin (as used in Example 1), granules of the rhodochrosite of 100 - 250 mesh were obtained. The catalyst A was produced by heating the granular ore at 350° C. for 4 hours in air.

Separately, the same granular ore of rhodochrosite was soaked into an aqueous cupric nitrate solution, and then after drying, 5 wt% of cupric nitrate was deposited thereon. The catalyst B was prepared by heating at 400° C. the ore carrying cupric nitrate for 4 hours in air.

The same gas which was used in Example 1 was passed through the catalysts A and B at a flow rate of 40,000 hr$^{-1}$ in terms of space velocity, respectively, while changing the temperature of reaction, to determine the ratio of NO$_x$-removal. The results are shown in Table 3 below.

Table 3

| | Ratio of NO$_x$-removal (%) | | |
|---|---|---|---|
| Reaction temperature (°C.) | 130 | 150 | 200 |
| Catalyst A | 84 | 95 | 98 |
| Catalyst B | 91 | 96 | 98 |

What is claimed is:

1. A method for the manufacture of a catalyst for use in the reduction of nitrogen oxides, which method comprises heating rhodochrosite in air at a temperature in the range of from 300° C. to 500° C.

2. The method according to claim 1, wherein the heating is continued until emission of carbon dioxide gas from the rhodochrosite substantially ceases.

3. A method for the manufacture of a catalyst for use in the reduction of nitrogen oxides, which method comprises:
   (a) mixing rhodochrosite and 1 to 80% by weight, based on the weight of said rhodochrosite, of a compound selected from the group consisting of the oxides of Fe, Ni, Cr, Co, Cu, Zn, Sn, Ti, V and W or of at least one compound which is converted into an oxide or oxy-hydrate when heated in air at a temperature in the range of from 300° C. to 500° C.; and
   (b) heating the resultant mixture in air at a temperature in the range of from 300° C. to 500° C.

4. The method according to claim 3, wherein said one compound is the nitrate, carbonate, hydroxide, ammonium salt or chloride of one metal selected from the group consisting of Fe, Ni, Cr, Co, Cu, Zn, Sn, Ti, V and W.

5. The method according to claim 3, wherein the heating is continued until emission of carbon dioxide gas from the rhodochrosite substantially ceases.

6. The catalyst produced by the process of claim 2 wherein the rhodochrosite is heated at about 400° C. for a period of about 5 to 10 hours.

7. The catalyst produced by the process of claim 5 wherein the mixture is heated at about 400° C. for a period of about 5 to 10 hours.

* * * * *